Aug. 29, 1967   D. A. AVNER   3,338,347
HYDRAULIC DAMPERS FOR VEHICLE SUSPENSIONS
Filed Sept. 8, 1965
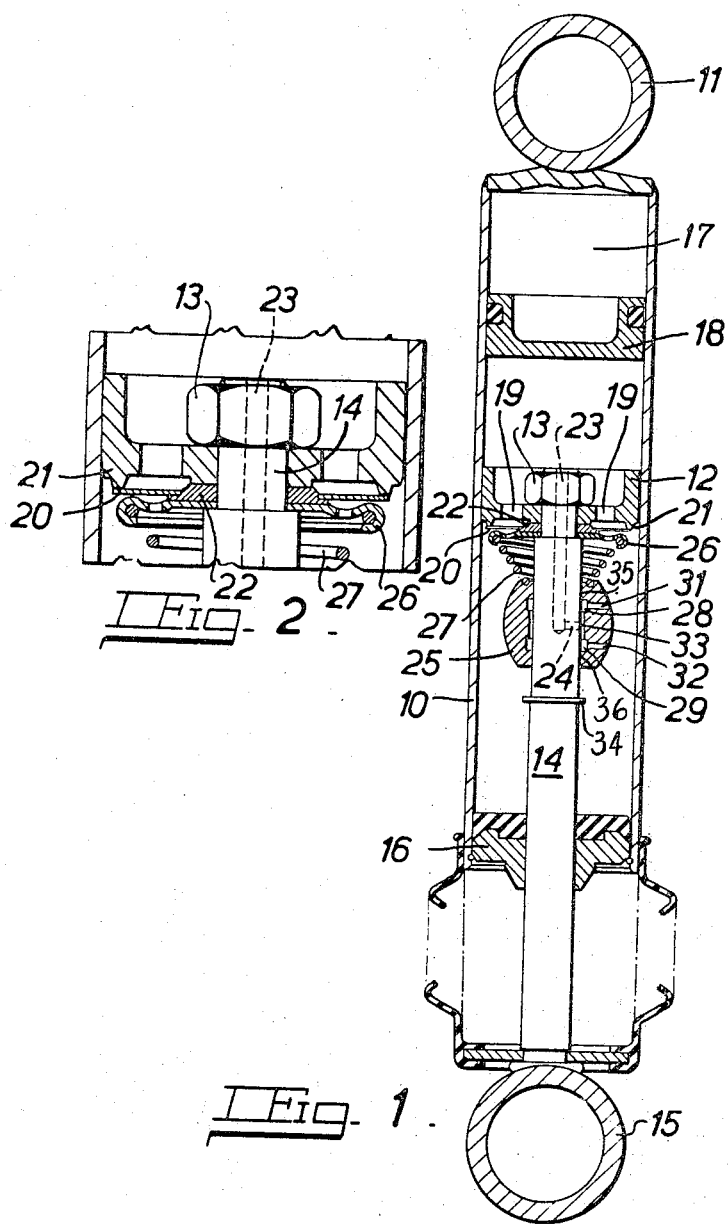

United States Patent Office 3,338,347
Patented Aug. 29, 1967

3,338,347
HYDRAULIC DAMPERS FOR VEHICLE
SUSPENSIONS
David Alan Avner, Coventry, England, assignor to Girling Limited, Birmingham, England, a British company
Filed Sept. 8, 1965, Ser. No. 485,873
Claims priority, application Great Britain, Sept. 8, 1964, 36,682/64
4 Claims. (Cl. 188—88)

This invention relates to improvements in hydraulic dampers for vehicle suspensions.

This invention relates to improvements in hydraulic dampers for vehicle suspensions of the kind in which axial movement of a piston in a cylinder containing hydraulic fluid is controlled by the passage of fluid through valves or through restricted orifices which may be located in the piston or in the cylinder.

Usually there is also a bleed passage of limited cross-sectional area by-passing the valves or restrictors.

According to our invention, in a damper of the kind set forth a bleed passage for hydraulic fluid by-passing the piston is controlled by a mass responsive to inertia forces and having a predetermined frequency response.

The movable mass is preferably arranged to open the bleed passage to prevent the transmission to the vehicle of shocks due to intermittent or random impulses and to close or restrict the passage at a tuned or selected frequency of response to increase the damping action of the unit as required to control wheel hop or bounce.

When a vehicle is in motion over an uneven road surface the vertical movements of the body which is supported by the suspension system occur at a much lower frequency than the vertical movements of a wheel, the difference in the frequencies being of the order of 1 to 10.

Movements of the body are damped normally by the flow of liquid through the by-pass while wheel bounce is controlled by the mass responsive to inertia forces which can increase or reduce or cut off flow through the by-pass according to conditions.

One form of damper embodying our invention is illustrated by way of example in the accompanying drawings in which:

FIGURE 1 is a longitudinal section of the complete damper; and

FIGURE 2 is a section of the piston assembly on a larger scale.

The body of the damper illustrated comprises a cylinder 10 closed at its upper end which carries an eye 11 for connecting the damper to the body of a vehicle. A piston 12 working in the cylinder is secured by a nut 13 to the upper end of a piston rod 14 carrying at its lower end an eye 15 for connection to an axle or wheel. The piston rod is slidable through a guide 16 closing the lower end of the cylinder and a seal located within the cylinder above the guide.

Air or other gas under pressure in a space 17 at the upper end of the cylinder is separated by an imperforate piston 18 freely slidable in the cylinder from hydraulic fluid in the remainder of the cylinder.

Flow of hydraulic fluid through the piston in both directions is permitted by axial passages 19 controlled by a valve formed by a resilient annular plate 20 co-operating with opposed concentric seatings 21 and 22.

An axial passage 23 in the piston rod open at its upper end leads at its lower end into a radial port 24 open at its outer end on the surface of the rod a short distance below the piston.

A sleeve 25 having an appreciable mass is slidably mounted on the piston rod and is suspended from a washer 26 forming part of the piston assembly by a spring 27 of such length and strength that when static the sleeve is supported in a position in which the centre of its length is in alignment with the port 24.

Annular grooves 28, 29 of substantial cross-sectional area are formed in the bore of the sleeve above and below the port 24 and each communicates with a radial passage or passages 31, 32 of substantial cross-sectional area leading to the outer surface of the sleeve.

The two grooves 28, 29 are connected by an annular passage 33 of restricted cross-sectional area formed by slightly enlarging the bore of the sleeve between the grooves, the bore above and below the grooves being a sliding fit on the piston rod and forming lands 35 and 36.

When the sleeve is in its normal central position relative to the port 24 in the piston rod as shown in the drawing the by-pass passage is formed by the axial passage 23 in the piston rod, the radial port 24, the restricted annular passage 33 in the bore of the sleeve, and both grooves 28, 29 and the radial passages 31, 32 connecting them to the outer surface of the sleeve.

On axial movement of the sleeve in either direction the length of the restricted annular passage through which the fluid flows between the port and one of the grooves is reduced until the groove 28 or 29 comes into alignment with the radial port 24 in the piston rod and flow is then substantially free. On further movement of the sleeve the groove passes the radial port which is closed by the part of the sleeve bore which is a sliding fit on the piston rod.

The sleeve 25 and its supporting spring 27 can be readily designed to form a spring/mass system having a predetermined frequency response which will normally be the frequency of wheel bounce.

A collar 34 may be fixed on the piston rod to limit the axial movement of the mass 25 away from the piston and so prevent over-stressing of the spring 27.

The mass-spring system is associated with an unsprung part of a vehicle. The damper illustrated, for example, will have the cylinder connected to the body or frame of the vehicle which is sprung and the piston rod will be connected to a wheel mounting.

Under the cyclic condition associated with wheel bounce the sleeve will move far enough to close the radial port 24 in the piston rod towards the end of its travel and so provide very high damping at the optimum time.

Random impulses on the wheel will move the sleeve into an intermediate position in which the radial port 24 is substantially in alignment with a groove 28 or 29 in the sleeve so that damping is reduced and the transmission of transient shocks to the body is minimised.

When cyclical input at wheel bounce frequency occurs, the tuned mass goes into resonance 90° out of phase and at an increased amplitude so that a very high resistance to liquid flow is provided at the maximum velocity position of the unsprung mass, which is thereby controlled very quickly.

Thus the damper allows very critical and effective damping for wheel bounce whilst avoiding unnecessarily high forces being transmitted through the unit to the body under random shock conditions.

The passage 28 and 29 in the sleeve need not be symmetrical about opposite sides of the port 24 in the piston rod and for some purposes it may be desirable to provide means for giving free flow on movement of the sleeve in only one direction and for cutting off the flow on movement in the other direction.

Further, it may be possible to provide the controlling passages in the piston rod in conjunction with a single passage in the sleeve.

One or more control passages operating independently of the movable mass may be provided in the piston or piston rod.

The principle of our invention can be applied to any device in which hydraulic fluid is throttled by means of valves or orifices to control vehicle suspension.

I claim:
1. An hydraulic damper for vehicle suspensions comprising a cylinder containing hydraulic fluid, a piston working in the cylinder, controlled passage for the flow of fluid between parts of the cylinder on opposite sides of the piston, a piston-rod carrying the piston and extending through one end of the cylinder, a bleed passage by-passing the piston and incorporating a port, a movable mass responsive to intertia co-operating with said port to open the bleed passage to prevent the transmission to a vehicle of shocks due to random impulses and to restrict the bleed passage at a tuned frequency of response thereby increasing the damping action of the unit to control hop or bounce of a wheel with the suspension of which the damper is associated, and a restricted passage into which opens said port and of which the length is reduced with increase in the amplitude of oscillation of the movable mass, said restricted passage communicating at opposite ends with passages passing through the mass, each of said last-mentioned passages providing, when it comes opposite the port as the piston reciprocates, relatively unrestricted flow of fluid.

2. An hydraulic damper for vehicle suspensions as claimed in claim 1, wherein said movable mass has a land adapted to move across and close said port upon a predetermined relative movement between said piston and said means being exceeded.

3. An hydraulic damper for vehicle suspensions as claimed in claim 1 wherein said movable mass comprises a sleeve in sliding engagement with the piston-rod and incorporating grooves and passages providing communication of different cross-sectional areas between said port and the cylinder according to the axial position of the sleeve.

4. An hydraulic damper for vehicle suspensions as claimed in claim 1 wherein said movable mass comprises a sleeve in sliding engagement with the piston-rod and a spring supporting said sleeve from the piston, the sleeve and spring forming a spring/mass system having a frequency response which will normally be the frequency of wheel bounce.

References Cited
UNITED STATES PATENTS

| | | | |
|---|---|---|---|
| 2,161,811 | 6/1939 | Grebe | 188—88 |
| 2,327,295 | 8/1943 | Whisler | 188—88 |
| 2,911,072 | 11/1959 | Schedl et al. | 188—88 |
| 2,934,175 | 4/1960 | Schnitzer | 188—88 |
| 3,001,611 | 9/1961 | Schnitzer | 188—88 |

MILTON BUCHLER, *Primary Examiner.*

G. E. A. HALVOSA, *Assistant Examiner.*